United States Patent
Matsubara

(10) Patent No.: US 8,587,537 B2
(45) Date of Patent: Nov. 19, 2013

(54) POSITION DETECTOR, POSITION DETECTING CIRCUIT AND POSITION DETECTING METHOD

(75) Inventor: Masaki Matsubara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 691 days.

(21) Appl. No.: 12/796,305

(22) Filed: Jun. 8, 2010

(65) Prior Publication Data

US 2010/0328240 A1    Dec. 30, 2010

(30) Foreign Application Priority Data

Jun. 29, 2009   (JP) ................. 2009-154204

(51) Int. Cl.
*G06F 3/041*        (2006.01)
(52) U.S. Cl.
USPC ........................................... 345/173
(58) Field of Classification Search
USPC ................................. 345/173–178
See application file for complete search history.

(56) References Cited

U.S. PATENT DOCUMENTS

| | | | |
|---|---|---|---|
| 4,591,710 A * | 5/1986 | Komadina et al. ............ | 250/221 |
| 7,078,918 B2 | 7/2006 | Umeda et al. | |
| 2003/0231170 A1* | 12/2003 | Yoshikawa et al. ........... | 345/173 |
| 2005/0141263 A1 | 6/2005 | Umeda et al. | |
| 2007/0085836 A1* | 4/2007 | Ely ................................ | 345/173 |
| 2010/0315102 A1* | 12/2010 | Portmann ..................... | 324/680 |

FOREIGN PATENT DOCUMENTS

| | | | |
|---|---|---|---|
| JP | 07084712 | * | 3/1995 |
| JP | 07084712 A | | 3/1995 |
| JP | 10020992 A | | 1/1998 |
| JP | 2005157643 A | | 6/2005 |

OTHER PUBLICATIONS

Japanese Office Action dated Feb. 19, 2013, for corresponding JP Application No. 2009-154204, 2 pages.

* cited by examiner

*Primary Examiner* — Viet Pham
(74) *Attorney, Agent, or Firm* — Seed IP Law Group PLLC

(57) ABSTRACT

A position detector is provided including: a transmission signal supplying circuit for supplying a transmission signal to a plurality of conductors disposed in a first direction; a first conductor selecting circuit for supplying the transmission signal outputted from the transmission signal supplying circuit to a predetermined conductor(s) of the plurality of conductors disposed in the first direction; a differentially amplifying circuit for differentially amplifying signals inputted thereto through its first and second input terminals, respectively, and outputting a resulting signal; and a second conductor selecting circuit for selecting a plurality of conductors including at least three conductors located close to one another in a plurality of conductors disposed in a second direction intersecting with the first direction, supplying signals from the conductors located on both end sides of the plurality of conductors thus selected to the first input terminal, and supplying a signal(s) from the conductor(s) other than the conductors located on both end sides, respectively, to the second input terminal.

20 Claims, 11 Drawing Sheets

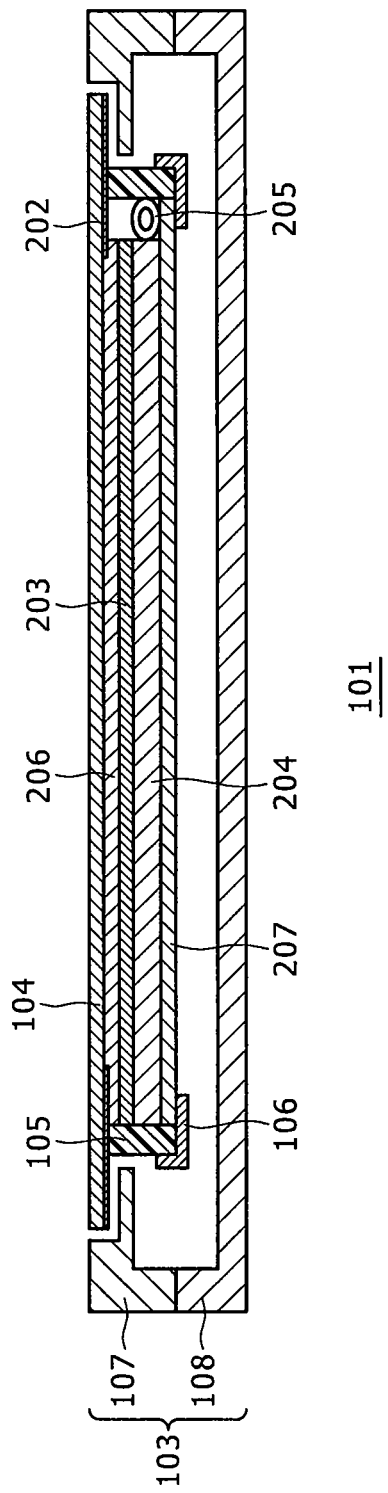

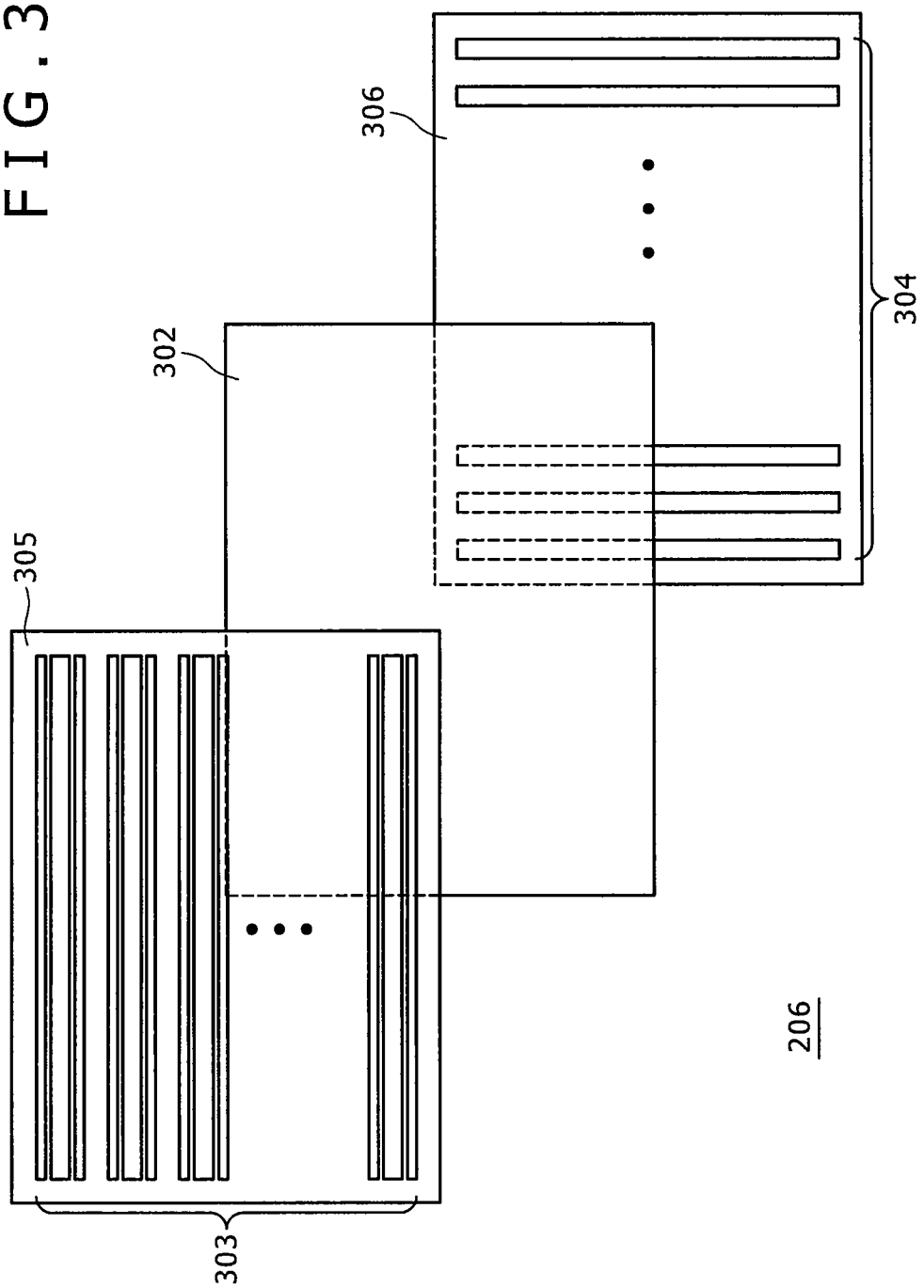

FIG.10

TRANSMISSION ELECTRODE SIDE ADDRESS →

RECEPTION ELECTRODE SIDE ADDRESS ↓

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 30 | 50 | 15 | 0 | 0 |
| 0 | 0 | 0 | 50 | 90 | 30 | 0 | 0 |
| 0 | 0 | 0 | 15 | 30 | 5 | 0 | 0 |
| 0 | 0 | 0 | 0 | 0 | 0 | 0 | 0 |
| 0 | 0 | 0 | 0 | 0 | 0 | 0 | 0 |

407

804

POSITION DETECTOR, POSITION DETECTING CIRCUIT AND POSITION DETECTING METHOD

CROSS-REFERENCE TO RELATED APPLICATION(S)

The present application claims priority to Japanese Patent Application No. 2009-154204, filed Jun. 29, 2009, the entire content of which is incorporated herein by reference.

BACKGROUND OF THE INVENTION

1. Field of the Invention

The present invention relates to a technique suitable for being applied to a position detector, a position detecting circuit, and a position detecting method.

More particularly, the present invention relates to a technique for reducing noises immixed from a position detection planar surface in a position detector using an electrostatic capacitance system, thereby enhancing a detection precision for a finger of the human body.

2. Description of the Related Art

There are known various kinds of input devices each of which gives position information to a computer. Of these input devices, there is known a two-dimensional position information input device (hereinafter referred to as "a position detector" for short) called a touch panel.

A touch panel is an input device such that a detection planar surface is touched with either a finger or an input device such as a dedicated pen, thereby carrying out a desired input manipulation for the computer or the like. Thus, with the touch panel, a position where either the finger or the dedicated pen touches is detected to specify a position on a screen, thereby issuing an instruction corresponding to the position where either the finger or the dedicated pen touches to the computer.

The touch panel is commonly used in a Personal Digital Assistant (PDA), an Automated Teller Machine (ATM) in a bank, a ticket-vending machine in a station, or the like.

There are known various kinds of position information detecting techniques each adopted in the touch panel. For example, there are known the position information detecting technique, using a resistance film system, for detecting a position in accordance with a change in pressure applied on a detection planar surface, the position information detecting technique, using an electrostatic capacitance system, for detecting a position in accordance with a change in electrostatic capacitance of a film on a surface of a detection planar surface, and so on.

The principles of an operation of the position detector using the electrostatic capacitance system will be described below.

Electrode lines are wired on each of a front surface and a back surface of an insulating sheet having a rectangular shape or the like. In this case, the electrode lines on the front surface of the insulating sheet, and the electrode lines on the back surface of the insulating sheet are disposed in a matrix as a whole. An AC signal is supplied to the electrode lines wired on one surface of the insulating sheet, and a current is detected from the electrode lines wired on the other surface of the insulating sheet. Capacitors are formed in respective intersection points between the electrode lines wired on the one surface of the insulating sheet, and the electrode lines wired on the other surface of the insulating sheet. Thus, when an AC voltage is applied across the electrode lines of the one surface of the insulating sheet, and the electrode lines of the other surface of the insulating lines, a current is caused to flow through each of the intersection points of the insulating sheet.

At this time, when a frequency of an AC signal is set, for example, at 200 kHz, and a finger of the human body is made to come close to the electrode lines wired on one side of the insulating sheet, there is caused a phenomenon that a part of the electric charges accumulated in the capacitor by applying the AC voltage across the capacitor is absorbed by the finger of the human body. A change in electrostatic capacitance of the capacitor caused by the absorption of the part of the electric charges in the finger of the human body is detected in accordance with the current caused to flow through the capacitor concerned. However, since the current capable of being detected is very weak, the current is converted into a voltage signal by a current-to-voltage converting circuit composed of a well-known operational amplifier, and a resulting voltage signal is then amplified.

The prior art related to the present invention is described, for example, in Japanese Patent Laid-Open No. Hei 10-020992.

SUMMARY OF THE INVENTION

Even when the detected current is subjected to the current-to-voltage conversion processing, and the resulting voltage signal is then amplified, the detected current is essentially the weak current. For this reason, the noises are immixed from the circumference of the position detector to the detected signal. In order to cope with such a situation, the noise canceling is carried out for the detected signal, which contains therein the noises immixed thereto, by a well-known differential amplifier.

The two electrode lines which are wired at a distance allowing the finger to be detected are selected from the electrode lines on the reception side, and the electrode lines on the reception side are connected to the differential amplifier. In this case, when the finger comes close to one of the two electrode lines, no finger necessarily comes close to the other of the two electrode lines. Thus, the presence of the finger can be detected by obtaining a difference between the two signals from the two electrode lines. In addition, the noise components, which are in phase with each other and which are immixed to the two electrode lines, are canceled out by the differential amplifier.

Hum noises or the like from a lamp line in the circumference of the position detector are immixed only to one of the two electrode lines through the human body.

The case of the noises immixed only to one of the two electrode lines through the human body causes a problem that, with the structure of the electrode lines on the reception side as described above, such noises cannot be canceled by the differential amplifier. As a result, there is encountered such a problem that the position of the finger cannot be properly detected, or the position detector itself malfunctions.

The present invention has been made in order to solve the problems described above, and according to one aspect the present invention provides a highly precise and useful position detector which is capable of effectively canceling noises immixed thereto through the human body with a simple configuration, a position detecting circuit, and a position detecting method.

According to an embodiment of the present invention, there is provided a position detector including: a conductor pattern in which a plurality of conductors are disposed in a first direction, and a plurality of conductors are disposed in a second direction intersecting with the first direction; a transmission signal supplying circuit for supplying a transmission signal to the plurality of conductors disposed in the first direction; a first conductor selecting circuit for supplying the transmission signal outputted from the transmission signal supplying circuit to a predetermined conductor(s) of the plurality of conductors disposed in the first direction; a differentially amplifying circuit having first and second input terminals for differentially amplifying signals inputted thereto through the first and second input terminals, respectively, and outputting a resulting signal; and a second conductor selecting circuit for selecting a plurality of conductors including at least three conductors located close to one another in the plurality of conductors disposed in the second direction, for supplying signals from the conductors located on both end sides of the plurality of conductors thus selected to the first input terminal of the differentially amplifying circuit, and for supplying a signal(s) from the conductor(s) other than the conductors located on the both end sides, respectively, to the second input terminal of the differentially amplifying circuit.

Each of the reception electrode lines composing the reception electrode is divided into three parts (three electrode lines). In this case, the central electrode line is connected to the plus side input terminal of the differential amplifier, and the electrode lines located on the both end sides of the central electrode line, respectively, are connected to the minus side input terminal of the differential amplifier. As a result, the noises immixed from the finger of the human body to the position detector can be effectively canceled by the differential amplifier.

According to another embodiment of the present invention, there is provided a position detecting circuit including: a transmission signal supplying circuit for supplying a transmission signal to a plurality of conductors disposed in a first direction in a conductor pattern in which the plurality of conductors are disposed in the first direction, and a plurality of conductors are disposed in a second direction intersecting with the first direction; a first conductor selecting circuit for supplying the transmission signal outputted from the transmission signal supplying circuit to a predetermined conductor(s) of the plurality of conductors disposed in the first direction; a second conductor selecting circuit for selecting a predetermined conductor(s) from the plurality of conductors disposed in the second direction; and a differentially amplifying circuit having first and second input terminals for differentially amplifying signals inputted to the first and second input terminals, respectively, and outputting a resulting signal; in which the plurality of conductors including at least three conductors located close to one another in the conductor pattern are selected by the second conductor selecting circuit, signals from the conductors located on both end sides of the plurality of conductors thus selected are inputted to the first input terminal of the differentially amplifying circuit, and a signal(s) from the conductor(s) other than the conductors located on the both end sides, respectively, is(are) supplied to the second input terminal of the differentially amplifying circuit, thereby outputting a signal corresponding to a contact made to the conductor pattern from the differentially amplifying circuit.

According to still another embodiment of the present invention, there is provided a position detecting method including the steps of: supplying a transmission signal to a plurality of conductors disposed in a first direction in a conductor pattern in which the plurality of conductors are disposed in the first direction, and a plurality of conductors are disposed in a second direction intersecting with the first direction; selecting a predetermined conductor(s) disposed in the first direction in the conductor pattern, and selectively supplying the transmission signal created in the transmission signal creating step; selecting at least three conductors located closer to one another and disposed in the second direction in the conductor pattern; and differentially amplifying signals from the conductors located on both end sides of the plurality of conductors selected in the step of selecting at least three conductors, and a signal(s) from the conductor(s) other than the conductors located on the both end sides, and outputting a resulting signal; in which a signal corresponding to a contact made to the conductor pattern is obtained in the differentially amplifying step.

As set forth hereinabove, according to the present invention, it is possible to provide a highly precise and useful position detector which is capable of effectively canceling the noises immixed thereto through the human body with a simple configuration, the position detecting circuit, and the position detecting method.

BRIEF DESCRIPTION OF THE DRAWINGS

FIG. 2 is a cross sectional view taken along line a-a' of FIG. 1A;

FIG. 3 is an exploded top plan view of a sensor board in the input device with a display function shown in FIGS. 1A and 1B, and FIG. 2;

FIG. 10 is a schematic diagram showing a relationship between a buffer memory and an address.

DETAILED DESCRIPTION OF THE PREFERRED EMBODIMENTS

The preferred embodiments of the present invention will be described in detail hereinafter with reference to the accompanying drawings.

<External Appearance of Input Device with Display Function>

Figure 1A:
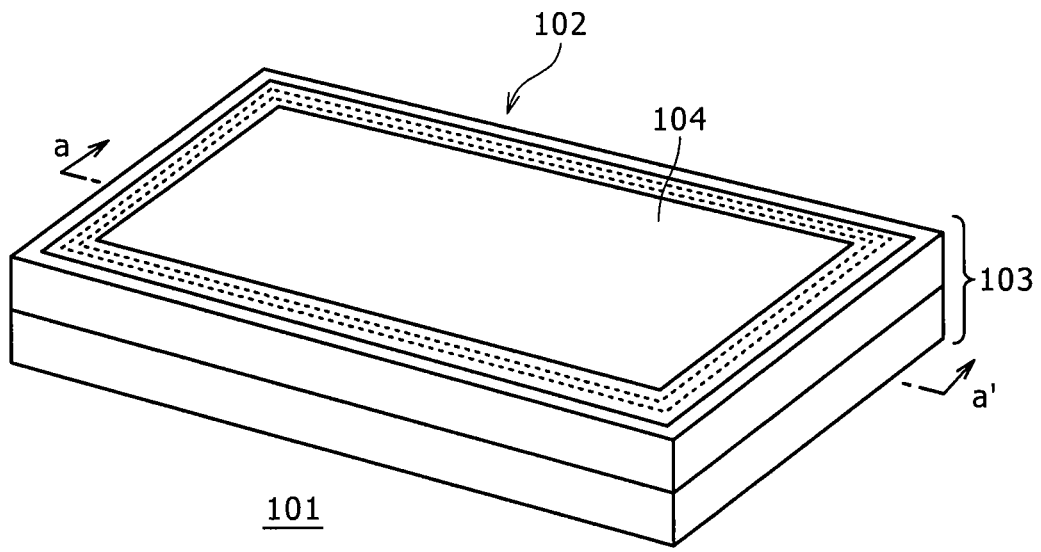
FIG. 1A is a perspective view showing an external appearance of an input device with a display function including an electrostatic capacitance type position detector according to an embodiment of the present invention.
Figure 1B:
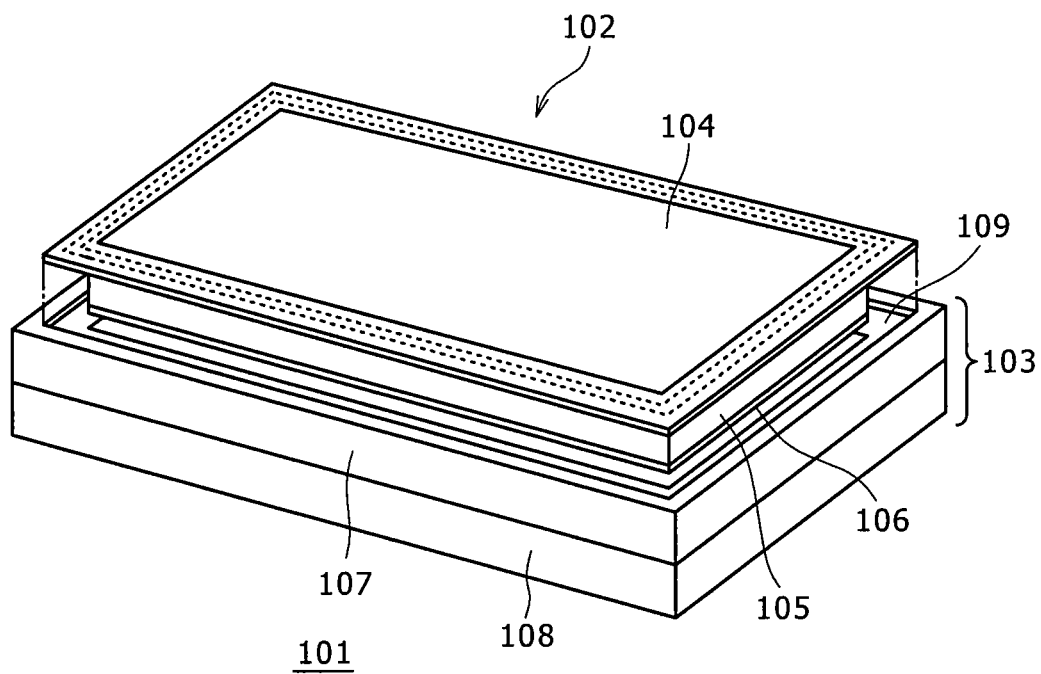
FIG. 1B is an exploded perspective view showing the input device with a display function including the electrostatic capacitance type position detector shown in FIG. 1A.

FIGS. 1A and 1B are a perspective view and an exploded perspective view, respectively, showing an external appearance of an input device with a display function including an electrostatic capacitance type position detector according to an embodiment of the present invention.

The input device 101 with a display function is a device in which a Liquid Crystal Display (LCD) device and a position detector using an electrostatic capacitance system are combined to be integrated with each other.

In the input device 101 with a display function, a liquid crystal module portion 102 is accommodated in a case portion 103. A surface of the liquid crystal module portion 102 and a peripheral portion of the case portion 103 are formed at the same height so that a user can carry out natural drawing when he/she carries out a desired drawing manipulation.

FIG. 1B is an exploded perspective view of the input device 101 with a display function.

The liquid crystal module portion 102 has a protective plate 104 composed of a transparent acrylic plate on a front surface thereof. A resin frame 105 is bonded to a back surface of the protective plate 104 by an adhesive agent. A metallic bezel 106 is screwed to a lower side of the resin frame 105 by screws (not shown).

The case portion 103 is formed by laminating an upper case 107 and a lower case 108. A recess portion 109 into which a peripheral portion of the protective plate 104 of the liquid crystal module portion 102 is fitted is formed in an inner peripheral portion of an upper surface of the upper case 107. On the other hand, although the lower case 108 is shown in FIG. 2, as will be described later, the lower case 108 has a sealed structure for protecting the back side of the liquid crystal module portion 102.

<Inner Construction of Input Device with Display Function>

FIG. 2 is a cross sectional view of the input device 101 with a display function, taken along line a-a' of FIG. 1A.

A serigraph surface 202 for shielding a bonding surface with the resin frame 105 to enhance a fine sight is provided in a periphery of the protective plate 104 composing the liquid crystal module portion 102.

The resin frame 105 is a frame which is made so as to be slightly smaller than the surface of the protective plate 104. One end of the resin frame 105 is adhered to the serigraph surface 202 provided in the periphery of the protective plate 104 by an adhesive agent.

A sensor board 206, a liquid crystal cell 203, a light guiding plate 204, a backlight 205, and a supporting plate 207 are laminated in order directly below the protective plate 104, and are accommodated in the resin frame 105.

The periphery of the supporting plate 207 is fastened to the resin frame 105 preventing the sensor board 206, the liquid crystal cell 203, the light guiding plate 204, the backlight 205, and the supporting plate 207 from coming off the resin frame 105 by screwing the metallic bezel 106 into the resin frame 105.

The liquid crystal cell 203 is the LCD. The backlight 205 is a light source, such as a fluorescent light or a white LED, which realizes light emission having a high luminance at a low electric power. The light guiding plate 204 is a transparent acrylic plate which guides a light radiated from the backlight 205 to the liquid crystal cell 203, and realizes irregular reflection of the light radiated from the backlight 205.

The sensor board 206 is a sheet-like transparent flexible printed board, and patterns of a reception electrode and a transmission electrode composing a sensor of the electrostatic capacitance type position detector are printed on the front surface and the back surface thereof, respectively. For the purpose of ensuring the visibility of the LCD, a transparent wiring pattern formed from a well-known indium tin oxide (ITO) film or the like is used in the sensor board 206. It is noted that a transparent printed board may also be used as the sensor board 206.

Next, a structure of the sensor board 206 will be described with reference to FIG. 3.

The sensor board 206 is a flexible printed board insulating two conductive layers provided on both surfaces thereof, respectively.

The sensor board 206 is composed of an insulating film 302, for example, made of a well-known polyimide material or the like. Also, the reception electrode 303 composed of linear conductors, and the transmission electrode 304 composed of linear conductors are fixed as wiring patterns on one surface and the other surface of the sensor board 206, respectively.

An insulating film 305 is provided on the protective plate 104 side of the reception electrode 303, and an insulating film 306 is provided on the liquid crystal cell 203 side of the transmission electrode 304.

Figure 4A:
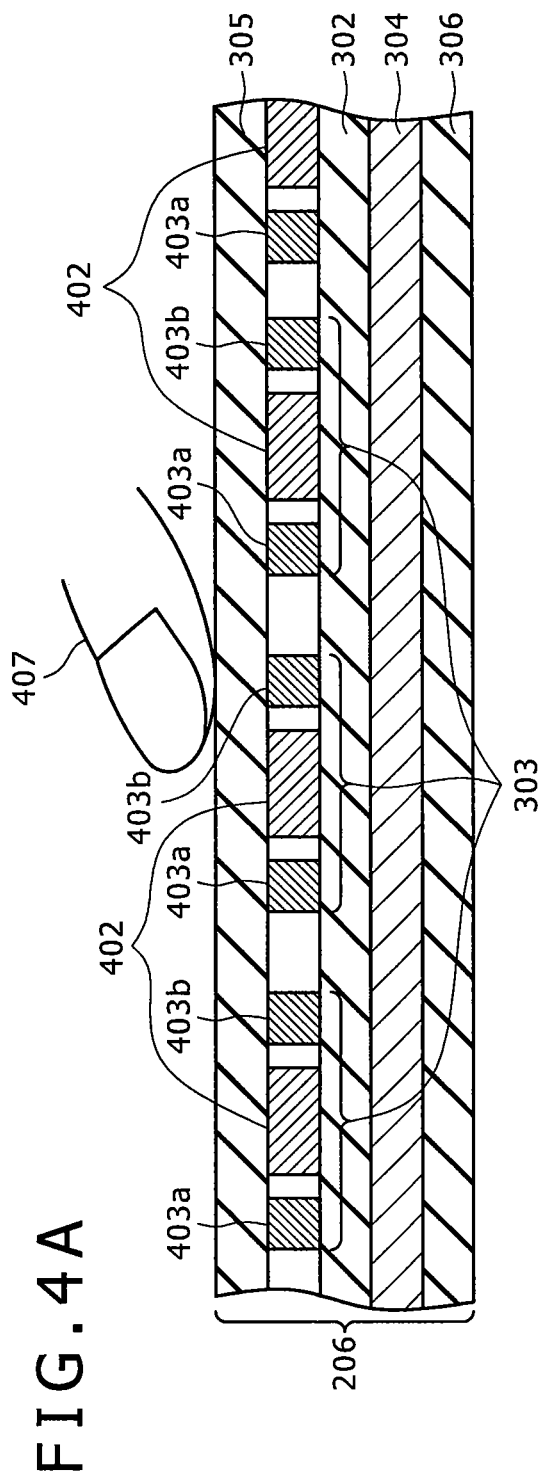
FIG. 4A is a partial cross sectional view of the sensor board shown in FIGS. 1A and 1B, and FIG. 2.

It is noted that a lamination state of the insulating film 305, the reception electrode 303, the insulating film 302, the transmission electrode 304, and the insulating film 306 is shown in the form of a cross sectional view in FIG. 4A.

The reception electrode 303 is formed in the form of a printed pattern so as to be parallel with a long side direction (second direction) of a rectangular sensor board 206. A thick electrode line, and thin electrode lines on both sides of the thick electrode line are disposed in the printed pattern of the reception electrode 303. Thus, multiple sets of three electrode lines are arranged on one surface of the sensor board 206, thereby composing the printed pattern of the reception electrode 303. The set of three electrode lines corresponds to one electrode line of the reception electrode in the prior art.

The transmission electrode 304 is formed in the form of a printed pattern so as to be parallel with a short side direction (first direction) of the rectangular sensor board 206. Thus, the transmission electrode 304 forms a right angle with the reception electrode 303.

Figure 4B:
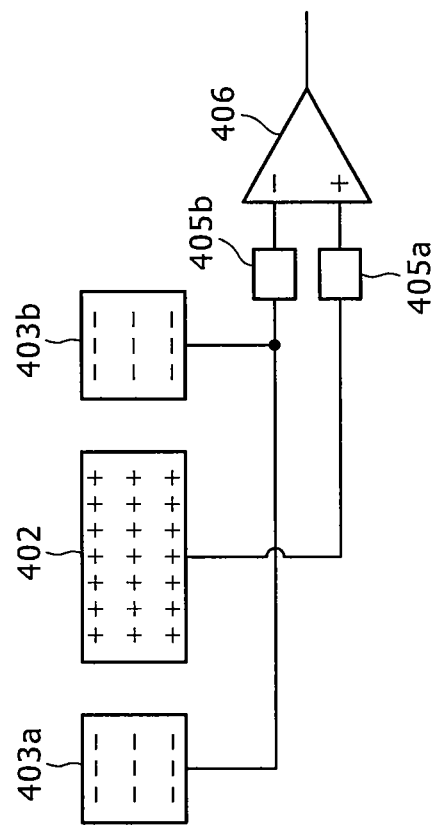
FIG. 4B is a partial circuit diagram showing the principles of an operation of a sensor of the electrostatic capacitance type position detector according to the embodiment of the present invention.

FIG. 4A is a partial cross sectional view of the sensor board 206, and FIG. 4B is a partial circuit diagram showing the principles of an operation of the sensor of the electrostatic capacitance type position detector. It should be noted that an illustration of the protective plate 104 is omitted in FIG. 4A for the sake of simplicity of the description.

A plus electrode line 402 is an electrode line having a larger width.

Minus side electrode lines 403a and 403b are electrode lines, each of which has a smaller width than that of the plus side electrode line 402, and which are disposed on both sides of the plus side electrode line 402, respectively.

FIG. 4B is the partial circuit diagram showing the reception electrode 303, and a signal processing circuit disposed in a stage next to the reception electrode 303. In this case, the reception electrode 303 includes the positive side electrode line 402, and the minus side electrode lines 403a and 403b disposed on both sides of the positive side electrode line 402, respectively. Also, the signal processing circuit is composed of current-to-voltage conversion circuits 405a and 405b, and a differential amplifier 406.

The plus side electrode line 402 is connected to a plus side input terminal of the differential amplifier 406 through the current-to-voltage conversion circuit 405a. Also, each of the minus side electrode lines 403a and 403b is connected to a minus side input terminal of the differential amplifier 406 through the current-to-voltage conversion circuit 405b.

Next, the principles of an operation of the reception electrode 303 of the electrostatic capacitance type position detector of the embodiment will be described in comparison to those in the prior art with reference to FIGS. 5A to 5D. It is noted that illustrations of the current-to-voltage conversion circuits 405a and 405b are omitted in FIGS. 5A to 5D for the sake of simplicity of the description.

Capacitors are formed in intersection points between the electrode lines of the reception electrode 303, and the electrode lines of the transmission electrode 304, respectively. Thus, an AC voltage is applied to the electrode lines of the transmission electrode 304, and a current is detected from corresponding one of the electrode lines in the reception electrode 303.

When a finger 407 comes close to the reception electrode 303, there is caused a phenomenon such that a part of electric lines of force (electric charges) is absorbed by the finger 407. Then, an electrostatic capacitance of corresponding one of the capacitors becomes small, and as a result, an amount of current detected from the corresponding one of the capacitors becomes less. The position detector using the electrostatic capacitance system detects this phenomenon.

Since the current capable of being detected by the actual position detector is very weak, the detected current is converted into a voltage by the well-known current-to-voltage conversion circuit, and a resulting voltage is then amplified.

Even when the detected current is subjected to the current-to-voltage conversion processing, and the resulting voltage signal is then amplified, the detected current is essentially the weak current. For this reason, the noises are immixed from the circumference of the position detector to the detected signal. In order to cope with such a situation, the noise canceling is carried out for the detected signal, which contains therein the noises immixed thereto, by the well-known differential amplifier.

A signal from a plus side electrode line 503a to which the finger 407 comes close, and a signal from a minus side electrode line 503b to which no finger 407 comes close are differentially amplified.

Figure 5A:
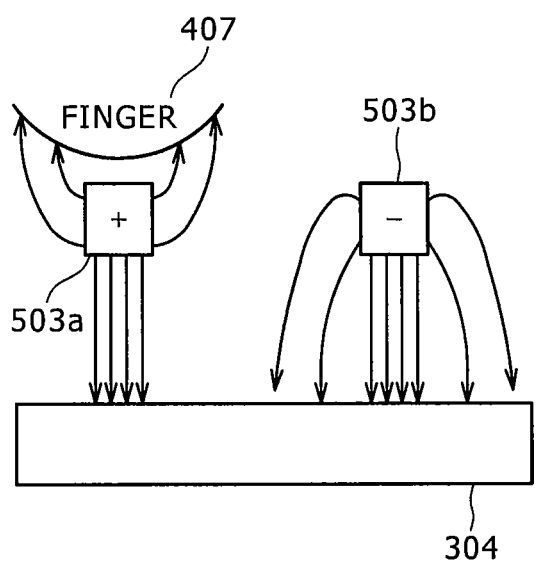
FIGS. 5A and 5B are schematic views showing the principles of an operation of a reception electrode in the electrostatic capacitance type position detector of the prior art.
Figure 5B:
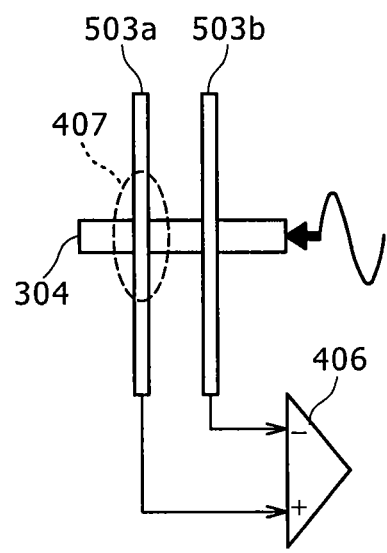

Referring to FIG. 5A, the finger 407 comes close to the plus side electrode line 503a, while no finger 407 comes close to the minus side electrode line 503b. In such a manner, the plus side electrode line 503a is disposed at a certain distance or more from the minus side electrode line 503b, and in this state, the signal from the plus side electrode line 503a and the signal from the minus side electrode line 503b are differentially amplified as shown in FIG. 5B. Then, the noise components which are in phase with each other, and which are immixed to the plus side electrode line 503a and the minus side electrode line 503b, are canceled out by the differential amplifier 406 composed of the operational amplifier.

However, for example, the hum noises or the like from the lamp line in the circumference of the electrostatic capacitance type position detector are immixed to the reception electrode 303 through the human body. With the structure of the reception electrode 303 as shown in FIG. 5A, such noises which are immixed through the human body are immixed only to the plus side electrode line 503a close to the human body. Therefore, such noises cannot be canceled out by the differential amplifier 406.

In order to cope with such a situation, in the present embodiment, a structure is adopted such that the reception electrode 303 itself is given a function of the noise canceling.

In the reception electrode 303 in the electrostatic capacitance type position detector of the embodiment, one reception electrode 303 of the prior art is divided into three parts (three electrode lines). The three parts for one reception electrode 303 of the prior art are structured in such a way that the plus side electrode line 402 is provided at the center, and the minus side electrode lines 403a and 403b are provided on both sides of the plus side electrode line 402, respectively.

A ratio of a width of the plus side electrode line 402 to a width of each of the minus side electrode lines 403a and 403b is, for example, set at 2:1. That is to say, the plus side electrode line 402 and the minus side electrode lines 403a and 403b are structured in such a way that an electrostatic capacitance of a capacitor formed in an intersection point between the plus side electrode line 402 and the electrode line of the transmission electrode 304 becomes equal to a sum of electrostatic capacitances of capacitors formed in respective intersection points between the two minus side electrode lines 403a and 403b and the electrode line of the transmission electrode 304.

Figure 5C:
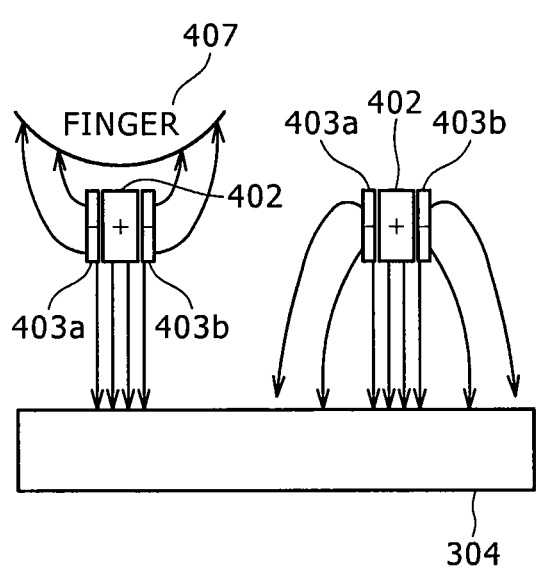
FIGS. 5C and 5D are schematic views showing the principles of an operation of a reception electrode in the electrostatic capacitance type position detector according to the embodiment of the present invention in comparison to the electrostatic capacitance type position detector of the prior art shown in FIGS. 5A and 5B.

Also, as illustrated in FIG. 5C, only the electric lines of force generated from the two minus side electrode lines 403a and 403b disposed on both sides of the plus side electrode line 402, respectively, are absorbed by the finger 407, leaving the number of electric lines of force from the two minus side electrode lines 403a and 403b to the transmission electrode 304 equal to the number of electric lines of force from the plus side electrode line 402 to the transmission electrode 304.

Figure 5D:
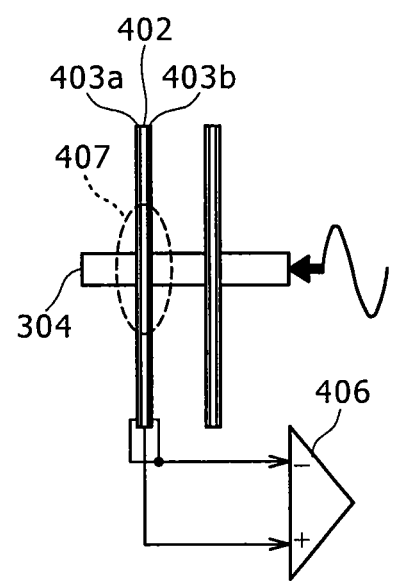

As shown in FIG. 5C, one electrode line of the reception electrode 303 in the prior art is divided into the plus side electrode line 402, and the two minus side electrode lines 403a and 403b, while any noise from the finger 407 is immixed substantially equally to both the plus side and minus side electrode lines 402 and 403a, 403b. Therefore, as shown in FIG. 5D, differential amplification can be carried out substantially only with one electrode line of the reception electrode line 303.

Since the reception electrode 303 is structured in the manner as described above, even the noises immixed to the electrostatic capacitance type position detector through the finger 407 of the human body can be canceled out by the differential amplifier 406.

A size of the reception electrode 303 structured as described above will be described below.

When the electrostatic capacitance type position detector is actually designed, for the purpose of exactly detecting the finger 407, widths of the plus side electrode line 402 need to be taken into consideration. An area on the reception electrode 303 contacted by a typical little finger is supposed to correspond to a size of about 7 to about 8 mm in diameter.

Thus, a sum of the width of the plus side electrode line 402, and the widths of the two minus side electrode lines 403a and 403b, is preferably set at about 3.2 mm as a numerical value which is half or less of the size of about 7 to about 8 mm in diameter.

When the sum of the width of the plus side electrode line 402 and the widths of the two minus side electrode lines 403a and 403b is 3.2 mm, the width of the plus side electrode line 402 becomes 3.2 mm/2=1.6 mm, and each of the widths of the two minus side electrode lines 403a and 403b becomes 1.6 mm/2=0.8 mm. Thus, the sum of the width of the plus side electrode line 402 and the widths of the two minus side electrode lines 403a and 403b become practically widths obtained by subtracting widths of trenches for ensuring isolation from these numerical values, i.e., 1.6 mm and 0.8 mm, respectively.

Hereinafter, a set of one plus side electrode line 402 and two minus side electrode lines 403a and 403b disposed on both sides of the one plus side electrode line 402, respectively, is referred to as "a set of reception electrode lines." A set of reception electrode lines corresponds to one electrode line of the reception electrode 303 in the prior art.

An interval between each adjacent two sets of reception electrode lines is set as approximately the same as that between each adjacent two electrode lines of the reception electrode 303 in the prior art. That is to say, although the resolution is enhanced when the sets of reception electrode lines are closely disposed, the number of lines in the sets of reception electrode lines correspondingly increases. As a result, it takes time to scan the entire position detection surface of the sensor board 206. Since even with the prior art, the resolution can be enhanced by compensating for the interval between each adjacent two electrode lines based on an arithmetic operation to calculate the center of gravity, which will be described later, the interval may be set as long as it allow such resolution to be sufficiently ensured.

<Configuration, Structure and Operation of Position Detector>

A configuration and an operation of the electrostatic capacitance type position detector of the embodiment will be described in detail hereinafter with reference to FIGS. 6 to 10.

The position detector 601 is composed of a signal supplying circuit 602, a transmission electrode selecting switch 603, a reception electrode selecting switch 604, an analog signal processing portion 605, an A/D converter 606, a control portion 607, and a matrix electrode 619 composed of the multiple electrode lines of the transmission electrode 304, and the multiple sets of reception electrode lines of the reception electrodes 303.

The signal supplying circuit 602 is a circuit for supplying an AC signal to the transmission electrode 304.

The transmission electrode selecting switch 603 is a switch for supplying an AC voltage signal created by the signal supplying circuit 602 in accordance with the control issued by the control portion 607, which will be described later, to the electrode lines composing the transmission electrode 304.

The reception electrode selecting switch 604 is a switch for connecting the multiple sets of reception electrode lines composing the reception electrode 303 to the analog signal processing portion 605 in the subsequent stage in accordance with the control issued by the control portion 607, which will be described later. The analog signal processing portion 605 is connected in the subsequent stage of the reception electrode selecting switch 604. The analog signal processing portion 605 amplifies the weak current signal detected through the reception electrode selecting switch 604, converts the weak current thus amplified into a voltage signal, and outputs a resulting voltage signal.

The A/D converter 606 converts the voltage signal inputted thereto from the analog signal processing portion 605 into a digital signal, and outputs the resulting digital signal.

The control portion 607 is composed, for example, of a microcomputer, and calculates data on a position where the finger 407 is detected in accordance with the digital data outputted from the A/D converter 606, and outputs the position data thus calculated.

An internal configuration of the signal supplying circuit 602 will be described in detail below.

The signal supplying circuit 602 is composed of a sine wave ROM 612, a reading portion 613, a clock generator 614, a D/A converter 615, a low-pass filter (LPF) 616, an amplifier 617, and a transmission controlling switch 618.

The sine wave ROM 612 is a Read Only Memory (ROM) in which digital data of a sine wave is stored with an address thereof.

The reading portion 613 reads out the digital data from the sine wave ROM 612 synchronously with a clock generated by the clock generator 614, and outputs the digital data similar to the sine wave.

The digital data outputted from the reading portion 613 is converted into an analog signal by the D/A converter 615.

Any of unnecessary high frequency components of the analog signal outputted from the D/A converter 615 is removed by the LPF 616, and thus the analog signal is shaped into an analog signal having a smoother sine wave.

After the sine wave analog signal outputted from the LPF 616 is voltage-amplified by the amplifier 617, the sine wave analog signal thus amplified is outputted to the transmission electrode selecting switch 603 through the transmission controlling switch 618. The transmission controlling switch 618 is controlled so as to be turned ON or OFF synchronously with an operation timing of the analog signal processing portion 605 and the A/D converter 606 on the reception side in accordance with the control issued by the control portion 607.

Figure 7:
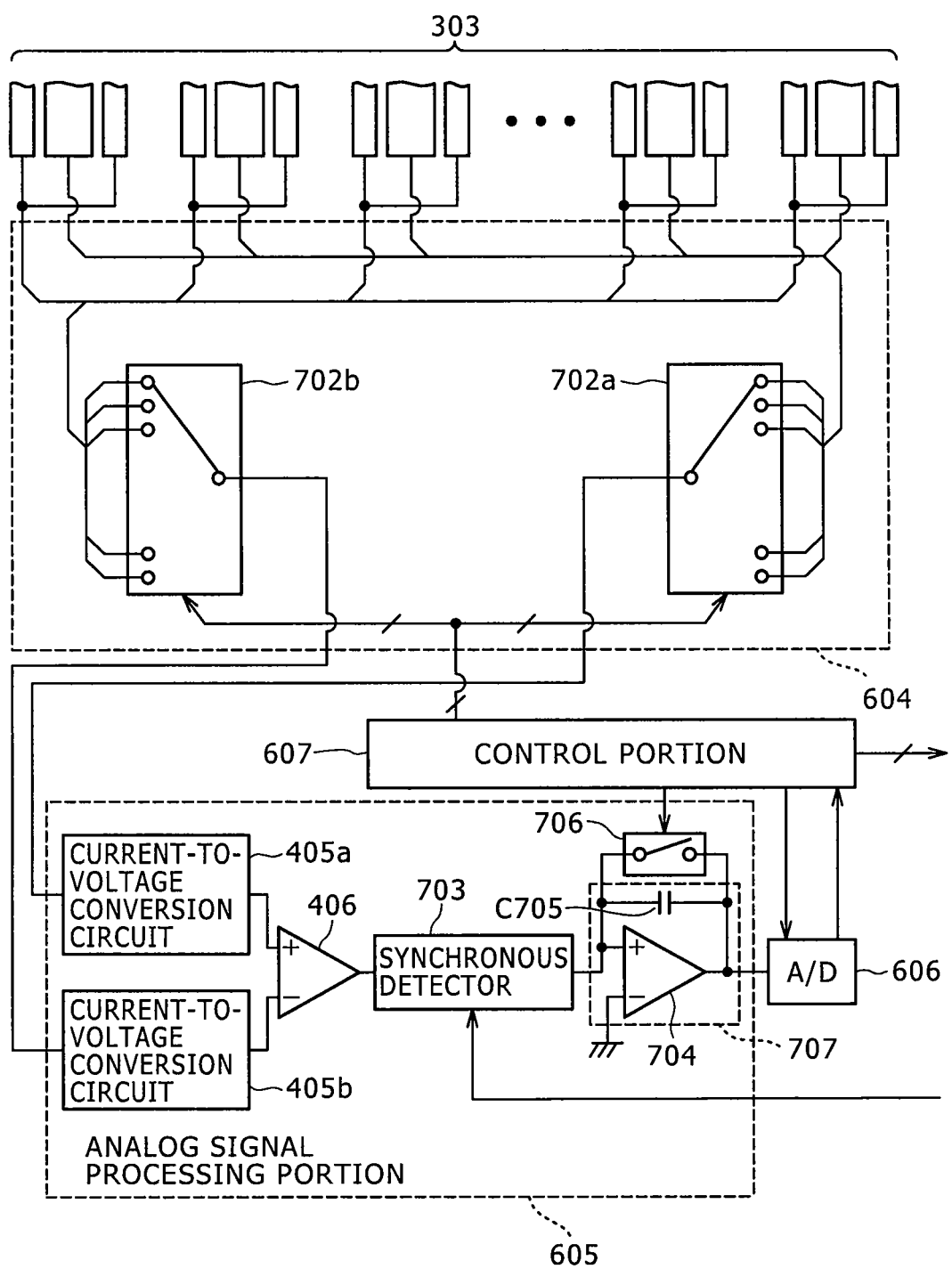
FIG. 7 is a block diagram showing configurations of a reception electrode selecting switch and an analog signal processing portion in the electrostatic capacitance type position detector according to the embodiment of the present invention.

Next, the reception electrode selecting switch 604 and the analog signal processing portion 605 will be described in detail with reference to FIG. 7.

The reception electrode selecting switch 604 is composed of two analog de-multiplexers 702a and 702b. One analog de-multiplexer 702a is a switch for selectively connecting the plus side electrode line 402 composing the set of reception electrode lines in the reception electrodes 303 to the analog signal processing portion 605. The other analog de-multiplexer 702b is a switch for selectively connecting the minus side electrode lines 403a and 403b composing the set of reception electrode lines in the reception electrodes 303 to the analog signal processing portion 605.

The two analog de-multiplexers 702a and 702b include respective terminals which are the same in number, and are controlled so as to be switched together in accordance with the same address specification data. The address specification data is supplied from the control portion 607 to each of the analog de-multiplexers 702a and 702b.

The analog signal processing portion 605 is composed of two current-to-voltage conversion circuits 405a and 405b, two differential amplifiers 406 and 704, a synchronous detector 703, and a reset switch 706. The output signal from the plus side electrode line 402, and the output signals from the minus side electrode lines 403a and 403b, are inputted to the current-to-voltage conversion circuits 405a and 405b, respectively.

The current-to-voltage conversion circuits 405a and 405b convert the output signal from the plus side electrode line 402, and the output signals from the minus electrode lines 403a and 403b, into the voltage signals, respectively, and input the resulting voltage signals to a plus side input terminal and a minus side input terminal of the differential amplifier 406, respectively.

The differential amplifier 406 is a differential amplifier composed of a well-known operational amplifier. The differential amplifier 406 differentially amplifies the voltage signals inputted thereto from the current-to-voltage conversion circuits 405a and 405b, respectively, and outputs the resulting voltage signal. The noise components which are in phase with each other, and which are immixed to the plus side electrode line 402 and the minus side electrode lines 403a and 403b, respectively, are canceled out with each other.

The output voltage signal from the differential amplifier 406 is inputted to the synchronous detector 703.

The synchronous detector 703 is an analog multiplier, for example, composed of a well-known operational amplifier. The sine wave voltage signal (detection signal) from the signal supplying circuit 602, and the output voltage signal from the differential amplifier 406 are both inputted to the synchronous detector 703. Also, the synchronous detector 703 synchronously detects the output voltage signal from the differential amplifier 406, and outputs a resulting voltage signal. The voltage signal outputted from the synchronous detector 703 is inputted to an integrator 707.

The integrator 707 is composed of an operational amplifier 704a and a capacitor C705. A reset switch 706 is connected to the integrator 707.

The reset switch 706 is a switch which is controlled so as to be turned ON or OFF in accordance with the control issued by the control portion 607, and is connected in parallel with the capacitor C705. Also, the capacitor C705 is charged with the electric charges or the electric charges are discharged from the capacitor C705 by turning ON or OFF the reset switch 706.

The analog voltage signal outputted from the synchronous detector 703 is integrated in the integrator 707, and is then outputted from the integrator 707.

The analog voltage signal from the integrator 707 is inputted to the A/D converter 606 to be subjected to the analog-to-digital conversion, and a resulting digital signal is outputted from the A/D converter 606. It is noted that conversion timing in the A/D converter 606 is controlled by the control portion 607.

The output digital signal (data) from the A/D converter 606 is inputted to the control portion 607. The control portion 607 outputs state information representing whether or not the finger 407 comes close to the sensor board 206, and position information representing which of the positions the finger 407 is located in, based on the digital data obtained from the A/D converter 606.

Figure 8:
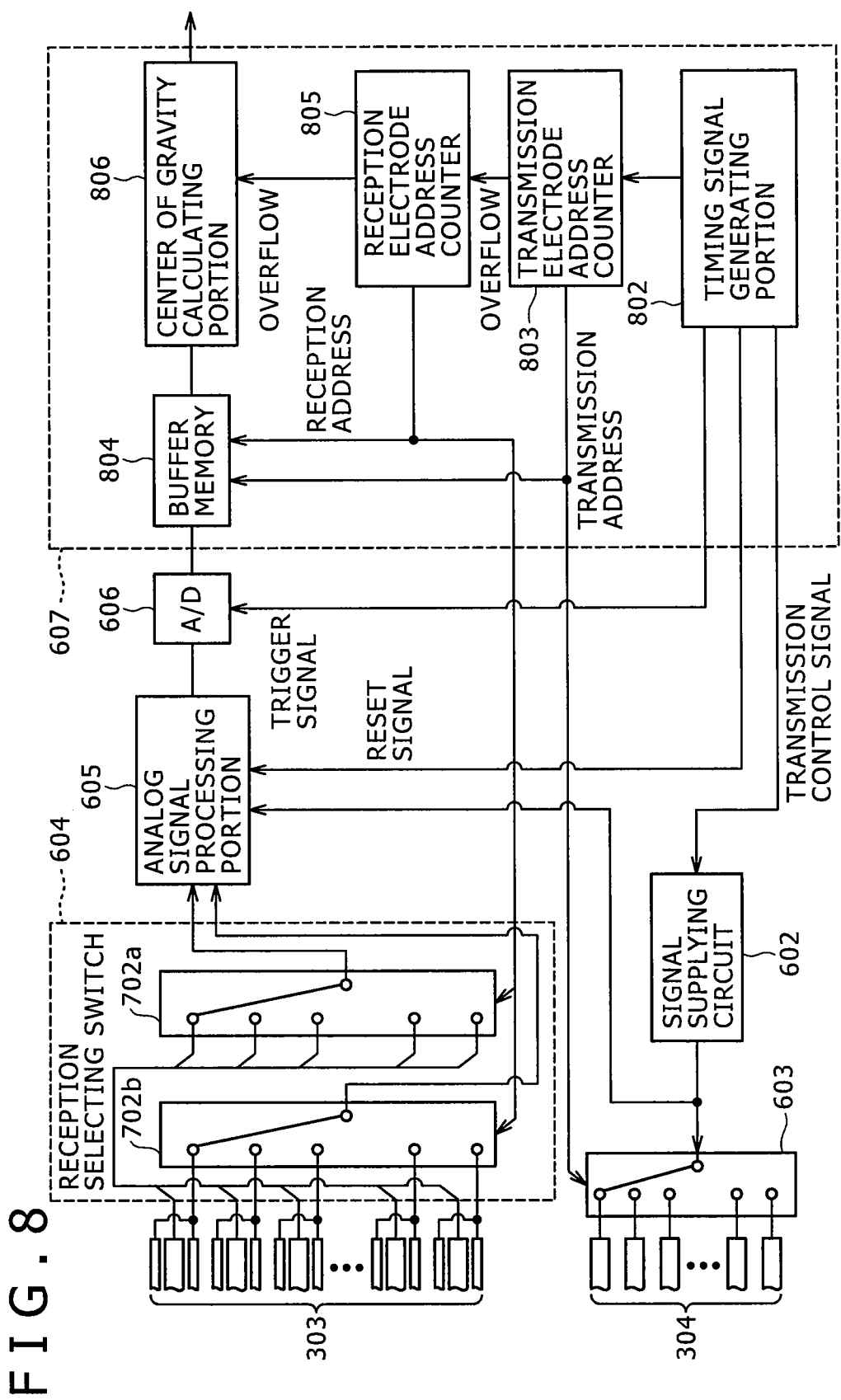
FIG. 8 is a block diagram showing a configuration of a control portion in the electrostatic capacitance type position detector according to the embodiment of the present invention.
Figure 9:
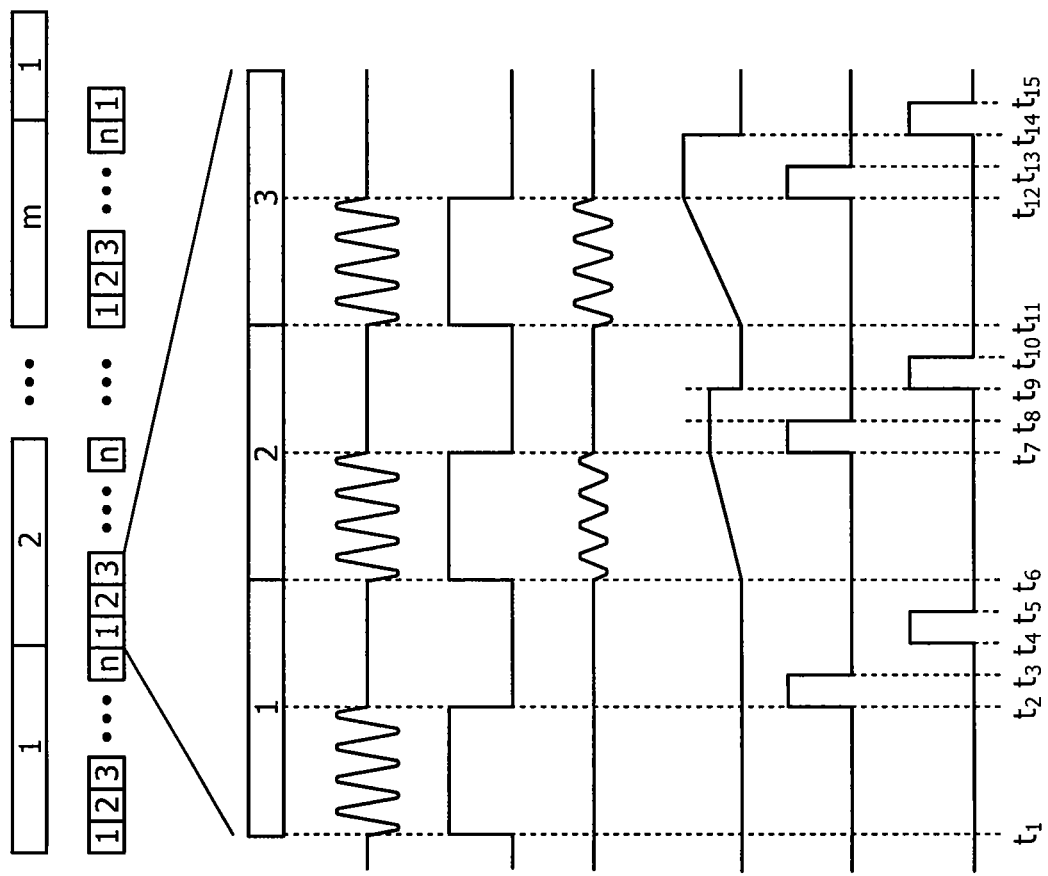
FIGS. 9A to 9I are respectively time charts of addresses and various kinds of signals.

Next, a configuration and an operation of the control portion 607 will be described in detail with reference to FIG. 8.

The control portion 607 is composed of a timing signal generating portion 802, a transmission electrode address counter 803, a buffer memory 804, a reception electrode address counter 805, and a center of gravity calculating portion 806.

The timing signal generating portion 802 outputs timing signals to the signal supplying circuit 602, the analog signal processing portion 605, and the A/D converter 606, respectively, and also supplies a clock signal to the transmission electrode address counter 803.

The transmission electrode address counter 803 counts pulses of the clock signal supplied thereto from the timing signal generating portion 802, supplies the count value as a transmission side address to each of the transmission electrode selecting switch 603 and the buffer memory 804.

The transmission electrode address counter 803 is a counter which can carry out the counting up to a maximum value equal to the number of electrode lines in the transmission electrodes 304. Also, the transmission electrode address counter 803 composes a loop counter in which the count value returns back to 1 when the count value exceeds the number of electrode lines in the transmission electrodes 304, that is, the maximum value. Also, in the transmission electrode address counter 803, an overflow bit becomes 1 when the counting is made to further proceed from the maximum value, so that the count value returns back to 1. Thus, the overflow bit is outputted from the transmission electrode address counter 803 to be supplied to the reception electrode address counter 805.

The reception electrode address counter 805 counts the overflow bits supplied thereto from the transmission electrode address counter 803, and supplies the count value as a reception electrode side address to each of the reception electrode selecting switch 604 and the buffer memory 804.

The reception electrode address counter 805 is a counter which can carry out the counting up to a maximum value equal to the number of sets of reception electrode lines in the reception electrode 303. Also, the reception electrode address counter 805 composes a loop counter in which the count value returns back to 1 when the count value exceeds the number of sets of reception electrode lines in the reception electrode 303. In the reception electrode address counter 805, an overflow bit becomes 1 when the counting is made to further proceed from the maximum value, so that the count value returns back to 1. The overflow bit is outputted to be supplied to the center of gravity calculating portion 806.

The buffer memory 804 is a memory for temporarily store the digital data from the A/D converter 606. An address of the digital data temporarily stored in the buffer memory 804 is determined based on both a transmission electrode side address outputted from the transmission electrode address counter 803, and a reception electrode side address outputted from the reception electrode address counter 805.

The center of gravity calculating portion 806 arithmetically determines presence or absence of the finger 407, and also arithmetically determines the position of the finger 407 by referring to the digital data temporarily stored in the buffer memory 804.

Figure 6:
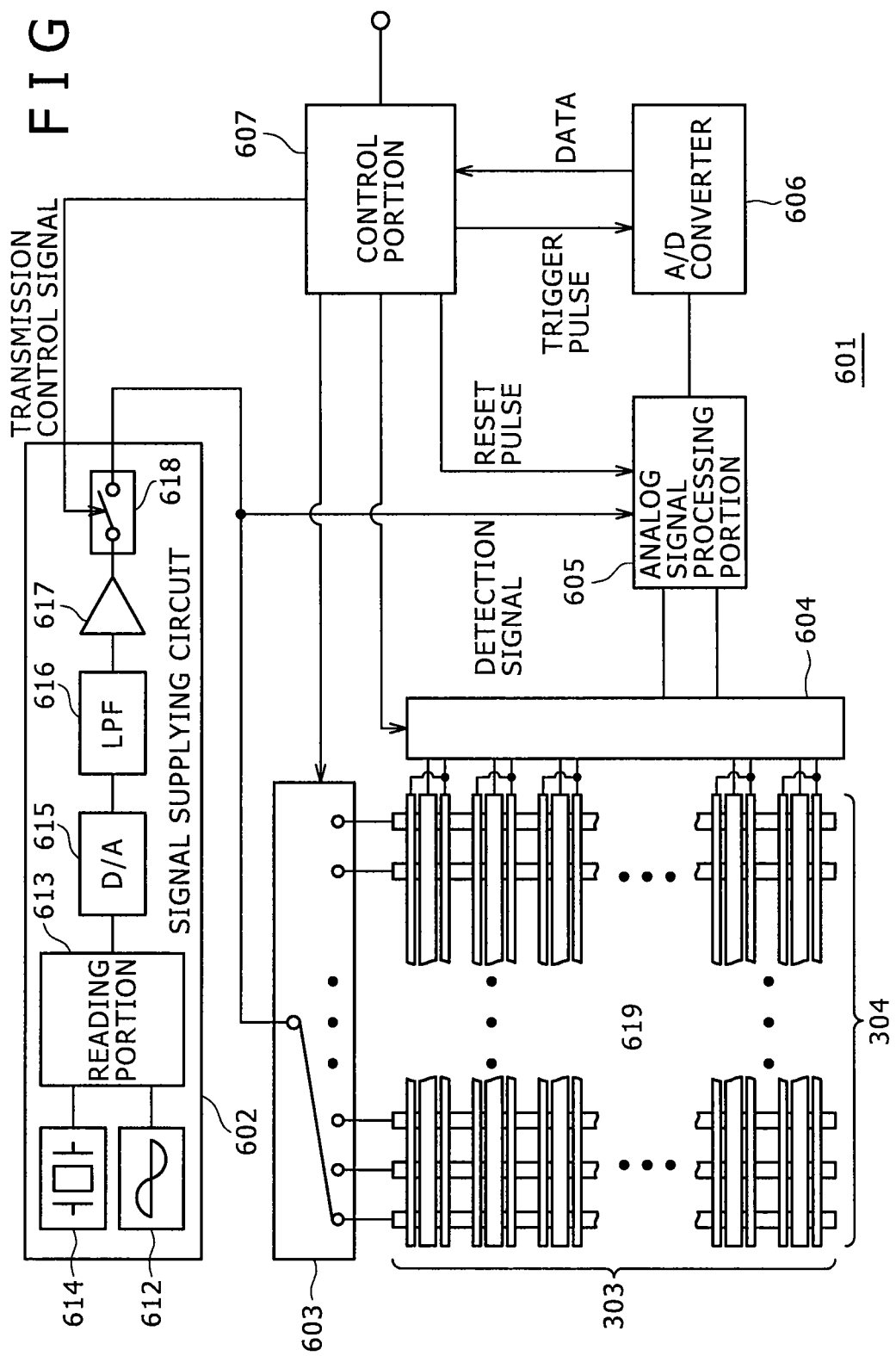
FIG. 6 is a block diagram showing a configuration of the entire electrostatic capacitance type position detector according to the embodiment of the present invention.

Next, an operation of the electrostatic capacitance type position detector 601 shown in FIG. 6 will be described in detail with reference to time charts shown in FIGS. 9A to 9I.

The transmission electrode side address (refer to FIG. 9B) starts with 1, and a maximum value thereof is n (n: natural number). The value, n, is equal to the number of electrode lines composing the transmission electrode 304. When the transmission electrode side address has reached n, the reception electrode side address is incremented by 1 (refer to FIG. 9A).

The reception electrode side address (refer to FIG. 9A) starts with 1, and a maximum value thereof is m (m: natural number). The value, m, is equal to the number of sets of plus side electrode lines 402, and minus side electrode lines 403a and 403b disposed on both sides of the plus side electrode lines 402, respectively, which compose the reception electrode 303, that is, the number of sets of reception electrode lines.

FIG. 9C is a time chart showing the transmission electrode side address, and shows a partially enlarged state of a time axis of FIG. 9B.

FIG. 9D is a waveform chart of the output signal from the signal supplying circuit 602.

FIG. 9E is a waveform chart of the transmission control signal supplied from the control portion 607 to the transmission controlling switch 618 of the signal supplying circuit 602. The transmission controlling switch 618 is held in an ON state when the transmission control signal is held at a high potential (t1 to t2, t6 to t7, and t11 to t12), and is held in an OFF state when the transmission control signal is held at a low potential (t2 to t6 and t7 to t11). Therefore, the signal supplying circuit 602 outputs the sine wave output signal (refer to FIG. 9D) only whenever the transmission control signal is held at the high potential.

FIG. 9F is a waveform chart showing the output signal obtained from the differential amplifier 406. The waveform of the output signal does not appear for a time period (t1 to t2) for which the finger 407 is absent. However, the signal having the same waveform as that of the AC voltage signal outputted from the signal supplying circuit 602 appears for a time period (t6 to t7) for which the finger 407 comes close to the set of reception electrode lines composing the reception electrode 303. The potential of this waveform becomes high as the finger 407 comes even closer to the set of reception electrode lines composing the reception electrode 303 (t11 to t12).

FIG. 9G is a waveform chart of the output signal from the integrator 707.

FIG. 9H is a waveform chart of a trigger signal supplied from the control portion 607 to the A/D converter 606.

FIG. 9I is a waveform chart of a reset signal supplied from the control portion 607 to the reset switch 706 connected in parallel with the integrator 707.

The trigger signal (refer to FIG. 9H) is held at the high potential whenever the transmission control signal is held at the low potential (t2, t7 and t12), that is, whenever the transmission controlling switch 618 is held on an OFF state. Since the trigger signal is an activation pulse for the A/D converter 606, the trigger signal is controlled so as to become the low potential after every lapse of a predetermined time period (t3, t8 and t13).

Also, whenever a time period sufficient for the A/D converter 606 to complete the analog-to-digital conversion processing for the input analog voltage changes, for the purpose of discharging the electric charges accumulated in the capacitor C705 of the integrator 707, the reset signal (refer to FIG. 9I) is set at the high potential (t4, t9 and t14). Then, the reset switch 706 is controlled so as to be turned ON, so that the electric charges accumulated in the capacitor C705 of the integrator 707 are discharged. Since the time period for discharging of the electric charges accumulated in the capacitor C705 is short, a short time later, the reset signal is controlled so as to become the low potential (t5, t10 and t15).

FIG. 10 is a schematic diagram showing a relationship between the buffer memory 804 and an address thereof.

The buffer memory 804 is a memory having bytes which are the same in number as the intersection points in the matrix electrode 619. The intersection points in the matrix electrode 619 are specified by sets of transmission electrode side address and reception electrode side addresses, respectively.

The values of the strengths of the signals detected in the intersection points in the matrix electrode 619, respectively, is stored in the buffer memory 804.

After the strengths of the signals are detected in all the intersection points in the matrix electrode 619, respectively, the values of the strengths of the signals detected in the intersection points in the matrix electrode 619, respectively, are stored in the buffer memory 804. FIG. 10 schematically shows the storage state of the buffer memory 804 at this time.

In an area, of the buffer memory 804, in which the finger 407 exists, the value of the signal strength increases toward the center of the finger 407. The center of gravity calculating portion 806 detects a distribution of the values of the signal strengths, and arithmetically determines a central point of the distribution, that is, the center of gravity.

The electrostatic capacitance type position detector 601 which has been described so far with reference to FIGS. 6 to 10 is not very different in signal processing from the electrostatic capacitance type position detector of the prior art except for the structure of the matrix electrode 619. In particular, the designs of the signal supplying circuit 602, the analog signal processing portion 605, and the A/D converter 606, each of which is configured in the form of hardware, need not be substantially changed.

The timing signal generating portion 802, the transmission electrode address counter 803, the reception electrode address counter 805, and the center of gravity calculating portion 806 in the control portion 607 configured in the form of a program need to be changed so as to correspond to the matrix electrode 619. Thus, only the software may need to be changed so as to correspond to the matrix electrode 619 while the hardware configuration of the electrostatic capacitance type position detector of the prior art may remain substantially the same, thereby making it possible to readily implement the control portion 607. Also, with the electrostatic capacitance type position detector 601 of the embodiment, the noises immixed thereto from the finger 407 of the human body can be effectively canceled out by the differential amplifier 406 as compared with the electrostatic capacitance type position detector of the prior art.

Application examples as will be described below are considered for the embodiment of the present invention.

(1) The ratio of the width of the plus side electrode line 402 to the width of each of the minus side electrode lines 403a and 403b need not be set as 2:1. The reason for this is because the dispersion of the levels of the input signals can be absorbed by adjusting the differential amplifier 406.

(2) With regard to the set of reception electrode lines composing the reception electrode 303, the electrode line disposed at the center of the set of reception electrode lines is defined as the plus side electrode line 402 and the electrode lines disposed on both sides of the central electrode line are defined as the minus side electrode lines 403a and 403b, respectively. However, the central electrode line of the set of reception electrode lines which is connected to the differential amplifier 406 need not be used as the plus side electrode line 402. That is to say, the polarities of the differential amplifier 406 and the set of reception electrode lines may be reversed. For example, in the set of reception electrode lines, the central electrode line may be defined as "the minus side electrode line," and the two electrode lines disposed on both sides of the central electrode line may be defined as "the plus side electrode lines," respectively. In this case, the central electrode line as the minus side electrode line is connected to the minus side input terminal of the differential amplifier 406, and each of the two electrode lines, disposed on both sides of the central electrode line, as the plus side electrode lines is connected to the plus side input terminal of the differential amplifier 406.

(3) Also, with regard to the set of reception electrode lines in the reception electrode 303, the structure in which the width of the plus side electrode line 402 disposed at the center of the set of reception electrode lines is larger than that of each of the minus side electrode lines 403a and 403b disposed on both sides of the plus side electrode line 402, respectively, need not be adopted.

Figure 11:
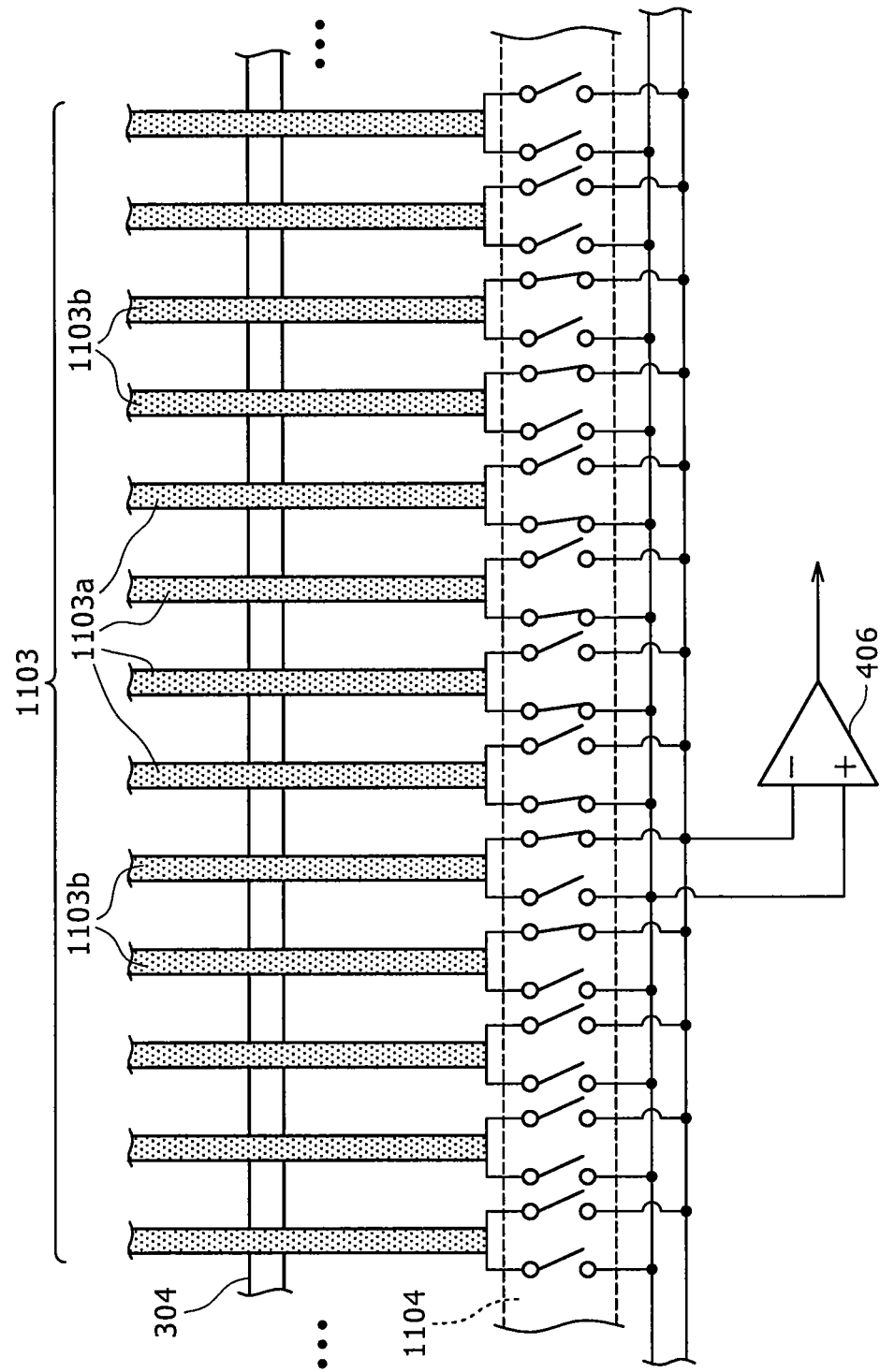
FIG. 11 is a schematic diagram, partly in circuit, showing a structure of a reception electrode, and a configuration of a reception electrode selecting switch in the electrostatic capacitance type position detector according to a different embodiment of the present invention.

FIG. 11 is a schematic diagram, partly in circuit, showing a reception electrode and a reception electrode selecting switch in an electrostatic capacitance type position detector according to another embodiment of the present invention.

The reception electrode 1103 is composed of conductors having a uniform line width.

In the reception electrode selecting switch 1104, a plurality of conductors 1103a of the reception electrode 1103 are connected to a plus side output terminal of a differential amplifier 406, and two pairs of conductors 1103b disposed on both sides of the plurality of conductors 1103a of the reception electrode 1103, respectively, are connected to a minus side input terminal of the differential amplifier 406. That is to say, the electrical characteristics substantially equal to those in the electrode lines of the previous embodiment each having a predetermined (varying) width can be realized using the number of conductors having a uniform line width which are connected to either the plus side input terminal or the minus side input terminal of the differential amplifier 406 by the reception electrode selecting switch 1104.

When the structure of the reception electrode 1103 and the reception electrode selecting switch 1104 shown in FIG. 11 is adopted, one conductor can be connected to either the plus side input terminal or the minus side input terminal of the differential amplifier 406 depending on the connection states of the reception electrode selecting switch 1104. Therefore, since the connection pattern of the reception electrode selecting switch 1104 can be moved (shifted) with one conductor as a unit, it is possible to enhance the resolution with which the position of the finger is detected.

As described above, each of the reception electrode lines composing the reception electrode is divided into three parts (electrode lines), and the central electrode line is connected to the plus side input terminal of the differential amplifier, and the electrode lines disposed on both sides of the central electrode line, respectively, are connected to the minus side input terminal of the differential amplifier. As a result, the noises immixed from the finger of the human body can be effectively canceled out by the differential amplifier.

Here, a position detecting circuit according to another embodiment of the present invention includes: the signal supplying circuit 602 for supplying the transmission signal to a plurality of electrode lines composing the transmission electrode 304 and disposed in the short side direction in the conductor pattern in which the plurality of electrode lines are disposed in the short side direction, wherein plural sets of reception electrode lines are disposed in the long side direction intersecting with the short side direction; the transmission electrode selecting switch 603 for supplying the transmission signal outputted from the signal supplying circuit 602 to a predetermined electrode line(s) of the plurality of electrode lines disposed in the short side direction; the reception electrode selecting switch 604 for selecting a predetermined set of reception electrode line(s) from the plural sets of reception electrode lines disposed in the long side direction; and the differential amplifier 406 having the plus side input terminal and the minus side input terminal for differentially amplifying the analog voltage signals inputted to the plus side input terminal and the minus side input terminal, respectively, and outputting the resulting analog voltage signal. In this case, the set of reception electrode lines including at least the plus side electrode line 402, and the minus side electrode lines 403*a* and 403*b* located on both sides of the central electrode line 402, are selected by the reception electrode selecting switch 604, the analog voltage signals from the minus side electrode lines 403*a* and 403*b* located on both end sides of the set of electrode lines thus selected are inputted to the minus side input terminal of the differential amplifier 406, and the analog voltage signal from the plus side electrode line 402 is supplied to the plus side input terminal of the differential amplifier 406, thereby outputting the analog voltage signal corresponding to a contact made on the conductor pattern from the differential amplifier 406.

In addition, a position detecting method according to still another embodiment of the present invention includes the steps of: supplying the transmission signal to a plurality of electrode lines disposed in the short side direction in the conductor pattern in which the plurality of electrode lines are disposed in the short side direction, wherein plural sets of reception electrode lines are disposed in the long side direction intersecting with the short side direction; selecting predetermined electrode line(s) disposed in the short side direction in the conductor pattern, and selectively supplying the transmission signal created in the transmission signal creating step; selecting the set of plus side electrode line 402, and minus electrode lines 403*a* and 403*b* located close to one another and disposed in the long side direction in the conductor pattern; and differentially amplifying the analog voltage signals from the minus electrode lines 403*a* and 403*b* located on both end sides of the plus side electrode line 402 selected in the step of selecting the set of plus side electrode line 402 and minus electrode lines 403*a* and 403*b*, and the analog voltage signal from the plus side electrode line 402, and outputting the resulting analog voltage signal. In this case, the analog voltage signal corresponding to a contact made on the conductor pattern is obtained in the differentially amplifying step.

Although the embodiments of the present invention have been described so far, the present invention is by no means limited thereto, and thus other changes and application examples are contained in the present invention without departing from the subject matter of the present invention described in the appended claims.

What is claimed is:

1. An electrostatic capacitance-type position detector capable of detecting a position indicated by a finger, comprising:
   a conductor pattern, in which a plurality of conductors are disposed in a first direction, and a plurality of conductors are disposed in a second direction intersecting with the first direction;
   a transmission signal supplying circuit for supplying a transmission signal to said plurality of conductors disposed in the first direction; and
   a differentially amplifying circuit having first and second input terminals for differentially amplifying signals inputted thereto through said first and second input terminals, respectively,
   the differentially amplifying circuit being configured to receive signals from at least three conductors located close to one another among said plurality of conductors disposed in the second direction, to thereby receive signals from the conductors located on both end sides of the at least three conductors via said first input terminal and to receive a signal(s) from the conductor(s), which is(are) located between said conductors located on both end sides of the at least three conductors, via said second input terminal.

2. The position detector according to claim 1, wherein in said plurality of conductors disposed in the second direction in said conductor pattern, the at least three conductors located close to one another form one unit, and the signals are supplied to said differentially amplifying circuit in said unit.

3. The position detector according to claim 1, wherein in said plurality of conductors disposed in the second direction in said conductor pattern, the at least three conductors adjacent to one another form one unit, and at least one conductor forming a first unit is contained in a second unit adjacent to the first unit.

4. The position detector according to claim 1, wherein the at least three conductors consist of three conductors, of which a width of the conductor located between the two conductors located on both end sides is made larger than that of each of the two conductors located on both end sides.

5. An electrostatic capacitance-type position detecting circuit capable of detecting a position indicated by a finger, comprising:
- a transmission signal supplying circuit for supplying a transmission signal to a plurality of conductors disposed in a first direction in a conductor pattern, in which the plurality of conductors are disposed in the first direction and a plurality of conductors are disposed in a second direction intersecting with the first direction; and
- a differentially amplifying circuit having first and second input terminals for differentially amplifying signals inputted to said first and second input terminals, respectively, and outputting a resulting signal;
- wherein, with respect to at least three conductors located close to one another out of said plurality of conductors disposed in the second direction, signals from the conductors located on both end sides of the at least three conductors are inputted to said first input terminal of said differentially amplifying circuit, and a signal(s) from the conductor(s), which is(are) located between said conductors located on both end sides of the at least three conductors, is(are) supplied to said second input terminal of said differentially amplifying circuit, thereby outputting a signal corresponding to a contact made on said conductor pattern from said differentially amplifying circuit.

6. The position detecting circuit according to claim 5, wherein the at least three conductors consist of three conductors adjacent to one another, signals from the two conductors located on both end sides of the three conductors are supplied to said first input terminal of said differentially amplifying circuit, and a signal from the conductor located between said two conductors located on both end sides is supplied to said second input terminal of said differentially amplifying circuit.

7. An electrostatic capacitance-type position detecting method for detecting a position indicated by a finger, comprising the steps of:
- supplying a transmission signal to a plurality of conductors disposed in a first direction in a conductor pattern, in which the plurality of conductors are disposed in the first direction and a plurality of conductors are disposed in a second direction intersecting with the first direction;
- selecting at least three conductors located close to one another from the plurality of conductors disposed in the second direction; and
- differentially amplifying signals from the conductors located on both end sides of the at least three conductors, and a signal(s) from the conductor(s), which is(are) located between said conductors located on both end sides of the at least three conductors, and outputting a resulting signal;
- wherein a signal corresponding to a contact made on said conductor pattern is obtained in said differentially amplifying step.

8. The position detecting method according to claim 7, wherein three conductors adjacent to one another are selected in said step of selecting at least three conductors, and signals outputted from the two conductors located on both end sides of the three conductors, and a signal outputted from the conductor located between said two conductors located on both end sides are differentially amplified in said differential amplification step, thereby outputting a resulting signal.

9. The position detecting circuit according to claim 5, wherein the at least three conductors located close to one another form one unit, and the signals are supplied to said differentially amplifying circuit in said unit.

10. The position detecting circuit according to claim 5, wherein the at least three conductors located close to one another form one unit, and at least one conductor forming a first unit is contained in a second unit adjacent to the first unit.

11. The position detecting circuit according to claim 5, wherein the at least three conductors consist of three conductors, of which a width of the conductor located between the two conductors located on both end sides is larger than that of each of the two conductors located on both end sides.

12. The position detecting circuit according to claim 11, wherein the width of the conductor located between the two conductors located on both end sides is equal to a sum of widths of the two conductors located on both end sides.

13. The position detecting circuit according to claim 5, wherein the at least three conductors include at least four conductors located close to one another, and a number of the conductors located between said conductors located on both end sides of the at least four conductors is greater than a number of the conductor(s) located on either of both end sides.

14. The position detecting circuit according to claim 13, wherein a width of each of the plurality of conductors disposed in the second direction is constant.

15. The position detecting method according to claim 7, wherein the at least three conductors located close to one another form one unit, and said differentially amplifying step processes the signals from the at least three conductors in said unit.

16. The position detecting method according to claim 7, wherein the at least three conductors located close to one another form one unit, and at least one conductor forming a first unit is contained in a second unit adjacent to the first unit.

17. The position detecting method according to claim 7, wherein the at least three conductors consist of three conductors, of which a width of the conductor located between the two conductors located on both end sides is larger than that of each of the two conductors located on both end sides.

18. The position detecting method according to claim 17, wherein the width of the conductor located between the two conductors located on both end sides is equal to a sum of widths of the two conductors located on both end sides.

19. The position detecting method according to claim 7, wherein at least four conductors located close to one another are selected, and a number of the conductors located between said conductors located on both end sides of the at least four conductors is greater than a number of the conductor(s) located on either of both end sides.

20. The position detecting method according to claim 19, wherein a width of each of the plurality of conductors disposed in the second direction is constant.

* * * * *